(12) United States Patent
Brown et al.

(10) Patent No.: US 8,453,606 B2
(45) Date of Patent: Jun. 4, 2013

(54) SLIDING ANIMAL ENCLOSURE LATCH

(75) Inventors: Troy Brown, Washington Court House, OH (US); Rod McAninch, Pleasant Plain, OH (US); Gary Silvis, Sardinia, OH (US)

(73) Assignee: The Mason Company, LLC, Leesburg, OH (US)

( * ) Notice: Subject to any disclaimer, the term of this patent is extended or adjusted under 35 U.S.C. 154(b) by 368 days.

(21) Appl. No.: 12/928,999

(22) Filed: Dec. 23, 2010

(65) Prior Publication Data

US 2012/0160179 A1 Jun. 28, 2012

(51) Int. Cl.
*A01K 1/00* (2006.01)
*E05C 9/00* (2006.01)
*E05C 1/00* (2006.01)

(52) U.S. Cl.
USPC .............................................. 119/416; 292/32

(58) Field of Classification Search
USPC .................... 119/416, 452, 481; 292/2, 8, 32, 292/137
See application file for complete search history.

(56) References Cited

U.S. PATENT DOCUMENTS

| | | | |
|---|---|---|---|
| 3,907,345 | A | 9/1975 | Martini |
| 4,062,575 | A | 12/1977 | Robins |
| 4,111,475 | A | 9/1978 | McCormick et al. |
| 4,135,747 | A | 1/1979 | Melilli |
| 4,167,281 | A | 9/1979 | Spencer |
| 4,198,085 | A | 4/1980 | Schacter |
| 4,254,975 | A | 3/1981 | Miller |
| 4,291,908 | A | 9/1981 | Gittins, Sr. |
| 4,592,578 | A | 6/1986 | Martin |
| 4,923,231 | A | 5/1990 | Bergman et al. |
| 4,932,693 | A | 6/1990 | Schwartz |
| 4,932,694 | A | 6/1990 | Carter, Sr. |
| 4,938,508 | A | 7/1990 | Thomas |
| 5,226,684 | A | 7/1993 | De La Garza |
| 5,275,450 | A | 1/1994 | Winter |
| 5,284,370 | A | 2/1994 | Dunn |
| 5,358,292 | A | 10/1994 | Van Wiebe et al. |
| 5,498,041 | A | 3/1996 | Bezzerides et al. |
| 5,593,141 | A | 1/1997 | Cain et al. |
| 6,036,245 | A | 3/2000 | Schaefer |
| 6,615,768 | B2 | 9/2003 | Fornes |

*Primary Examiner* — Monica Williams
(74) *Attorney, Agent, or Firm* — Taft Stettinius & Hollister LLP

(57) ABSTRACT

Devices, apparatuses, systems and/or methods related to animal enclosure latches. Specifically, the disclosed devices, apparatuses, systems and/or methods relate to animal enclosure latches having a slide bolt and a pendant, where the operation of the slide bolt and pendant require separate movements, thus decreasing the likelihood that an animal may open the latch.

20 Claims, 5 Drawing Sheets

SLIDING ANIMAL ENCLOSURE LATCH

BACKGROUND

It is desired that animal enclosure latch systems be secure enough to keep enclosed animals with an animal enclosure. Further, it desired that animal enclosures include a latch that restricts enclosed animals from accidentally or purposely opening the latch and exiting the animal enclosure.

Therefore, it would be desirable to have a secure animal enclosure latching device that decreases the likelihood that an animal may open the latch.

SUMMARY OF THE DISCLOSURE

This disclosure is drawn to devices, apparatuses, systems and/or methods related to animal enclosure latches. Specifically, the disclosed devices, apparatuses, systems and/or methods relate to animal enclosure latches having a slide bolt and a pendant, where the operation of the slide bolt and pendant require separate movements, thus decreasing the likelihood that an animal may open the latch.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
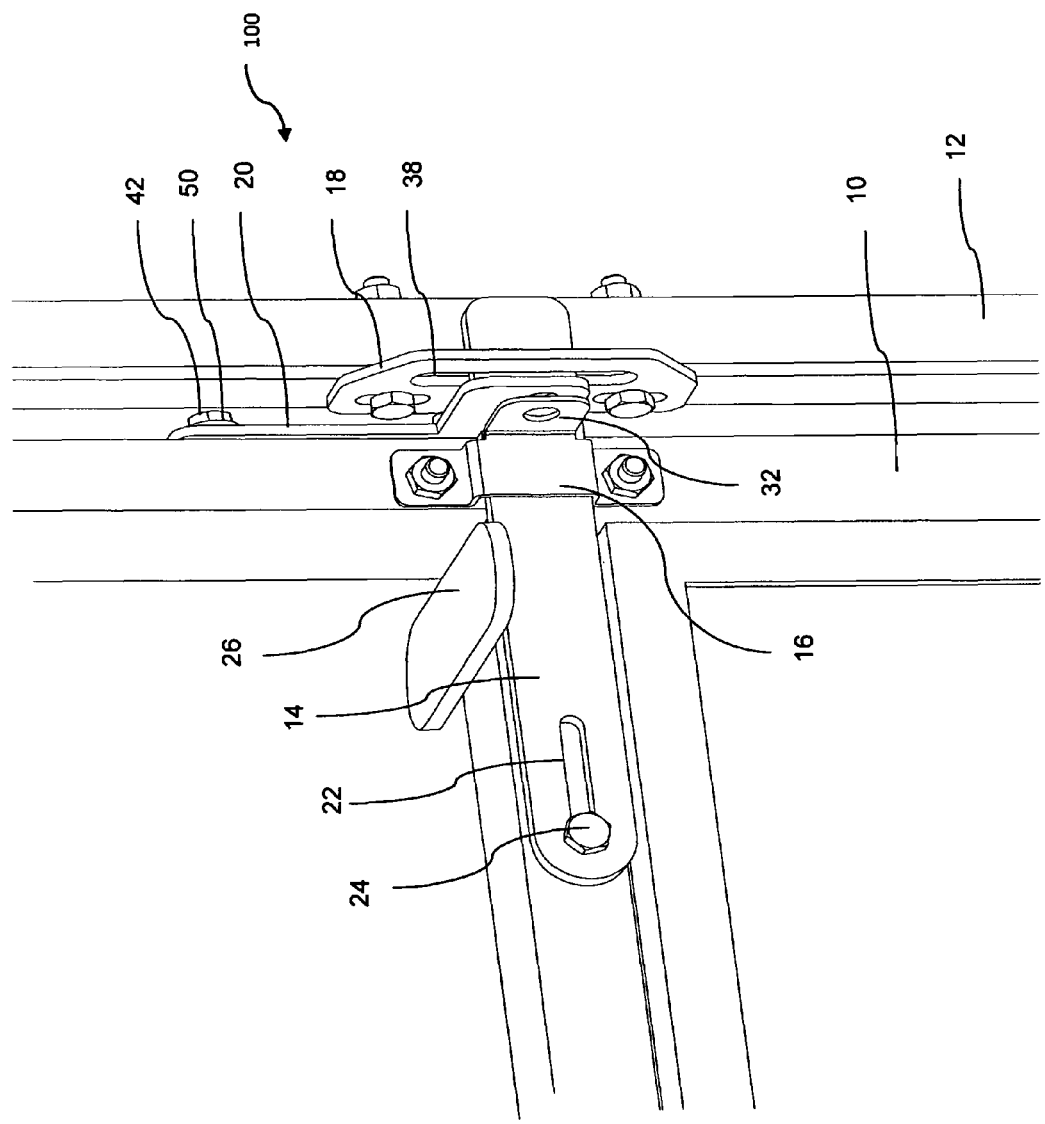
FIG. 1 is a diagram depicting an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In an exemplary embodiment, as generally depicted in FIG. 1, an animal enclosure latching device 100 for latching an animal enclosure gate 10 to an animal enclosure 12 is provided. An exemplary embodiment may include a slide bolt 14, a retainer 16, a catch 18, and a pendant 20. The slide bolt 14 may be slidably coupled to the animal enclosure gate 10. This allows a latch operator to slide the slide bolt 14 relative to the animal enclosure gate 10. The retainer 16 may be coupled to the animal enclosure gate 10 to guide the slide bolt 14 as the slide bolt 14 slides relative to the animal enclosure gate 10. The catch 18 may be coupled to the animal enclosure 12. The catch 18 may be aligned with the slide bolt 14 such that the catch 18 may receive the slide bolt 14. The pendant 20 may be slidably coupled to the animal enclosure gate 10. The pendant 20 may engage the slide bolt 14. In some examples, the pendant 20 may engage the slide bolt 14 such that the slide bolt 14 is substantially restricted from sliding. In this manner, an animal inside the animal enclosure 12 may be safely locked within the animal enclosure 12, restricting the animal from exiting the animal enclosure 12.

Figure 2:
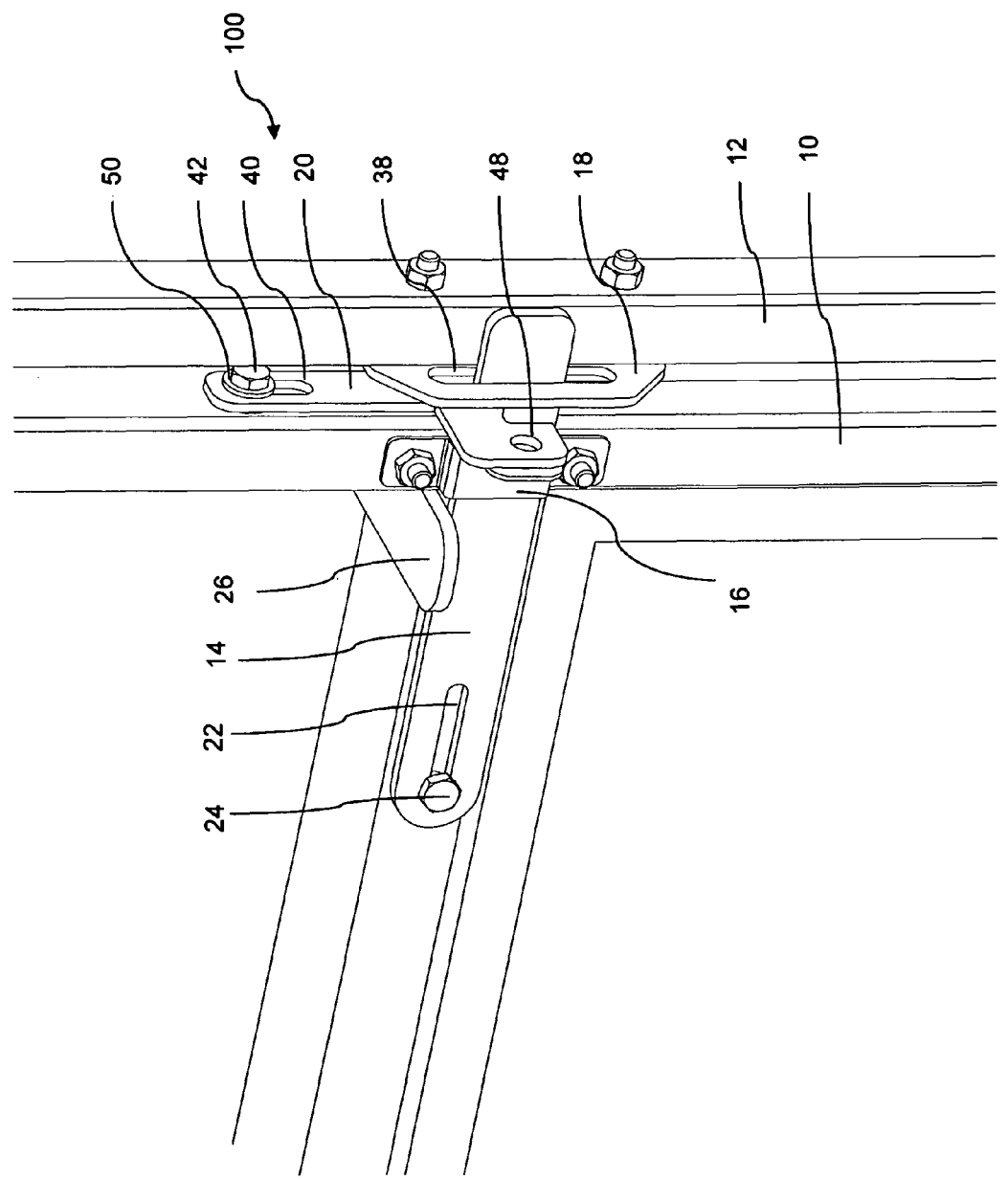
FIG. 2 is a diagram depicting another example embodiment.
Figure 3:
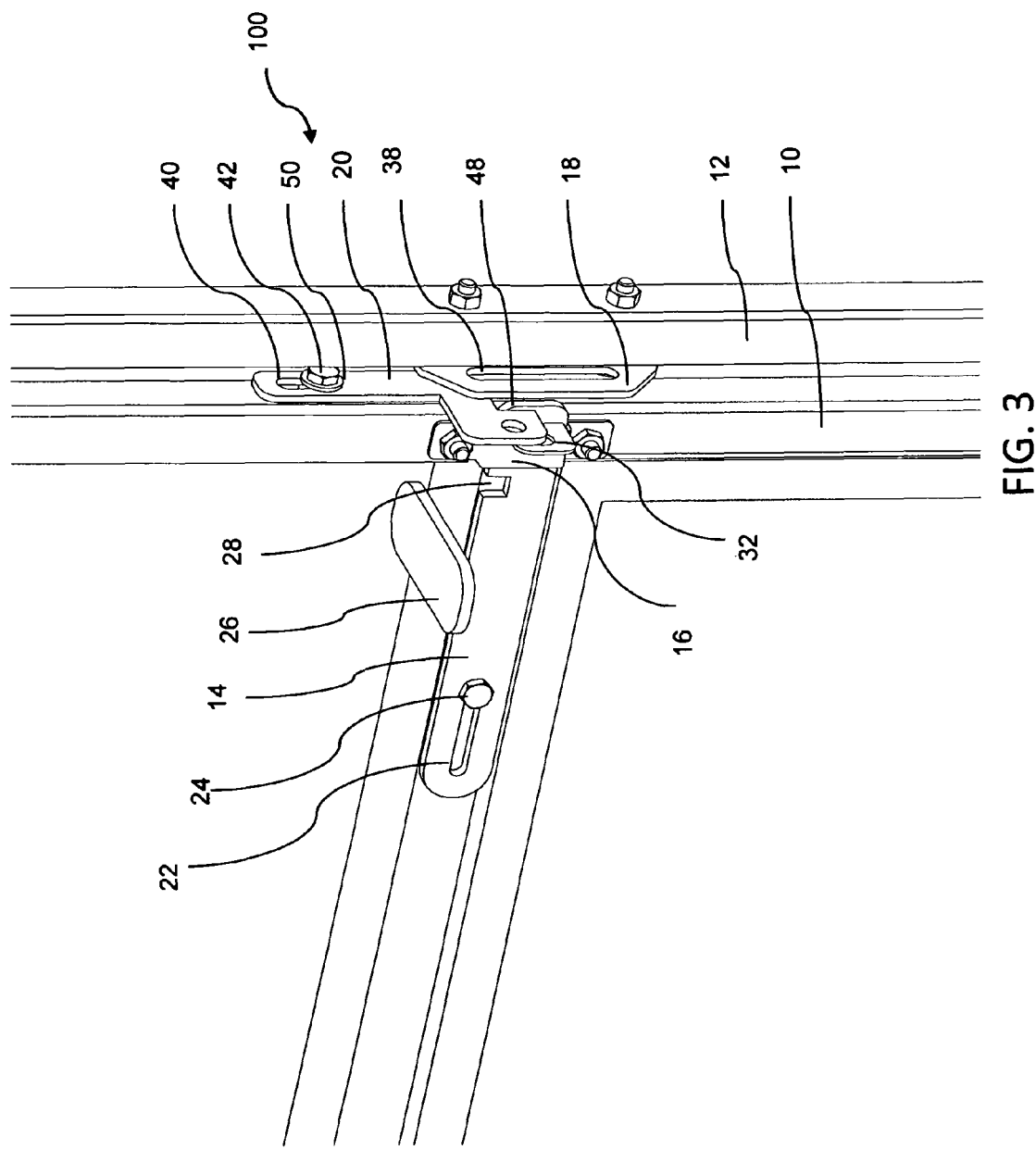
FIG. 3 is a diagram depicting yet another example embodiment.
Figure 4:
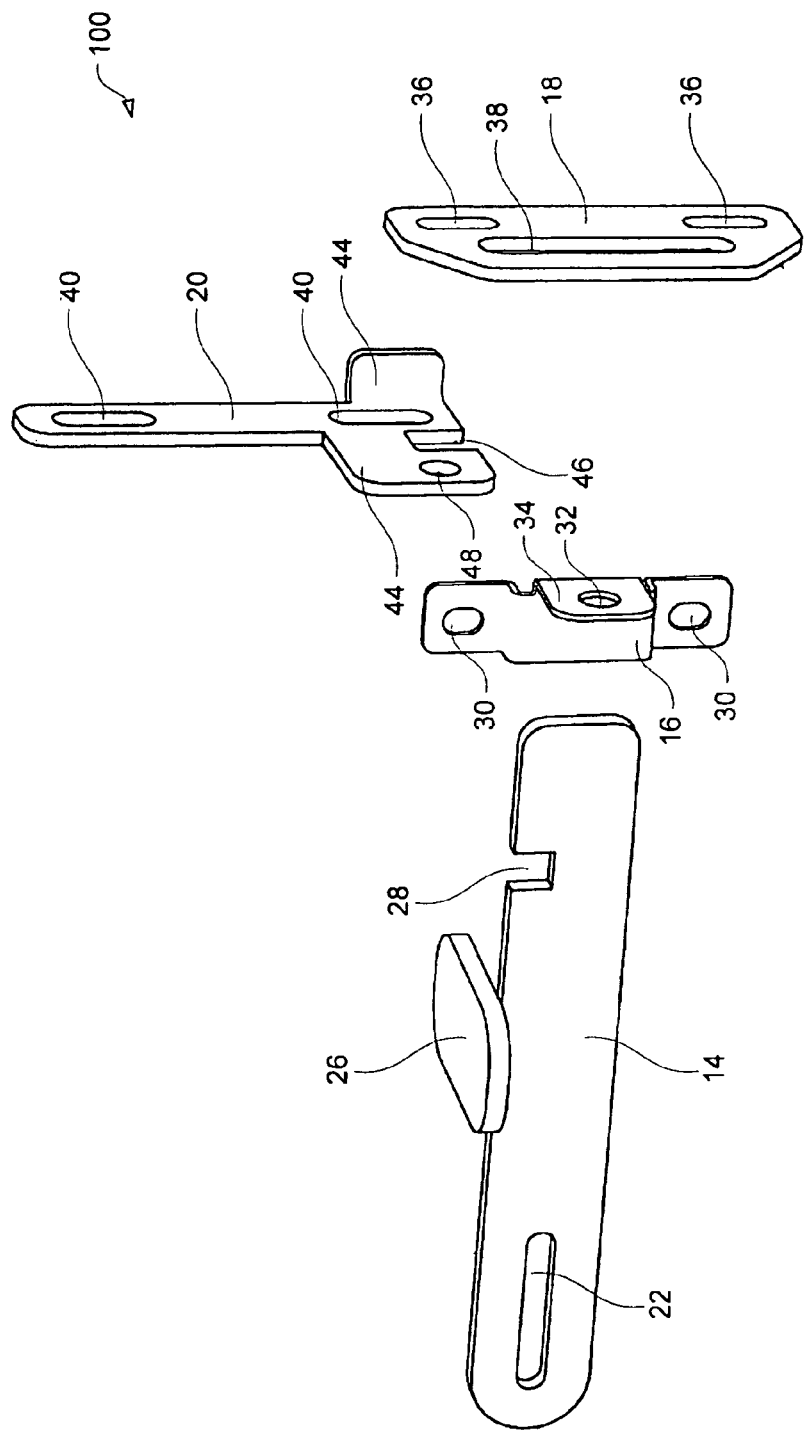
FIG. 4 is a diagram depicting an exploded view of an additional example embodiment.

In some examples, the slide bolt 14 may include a slide bolt hole 22 into which a slide bolt fastener 24 may fit. The slide bolt hole 22 may be of any shape that allows the slide bolt fastener 24 to move within it relative to the slide bolt hole 22. The slide bolt fastener 24 may include bolts, screws, nails and other similar fasteners, and may be coupled to the animal enclosure gate 10 at a fixed location. During operation of the slide bolt 14, the slide bolt hole 22 may move relative to the slide bolt fastener 24. In this manner, the slide bolt 14 may move from a first position to a second position relative to the animal enclosure gate 10. FIGS. 2 and 3 depict examples of a first position of the slide bolt 14 and a second position of the slide bolt 14, respectively. In some examples, the animal enclosure gate 10 may include the one or more slide bolt hole 22 and the slide bolt fastener 24 may be coupled to the slide bolt 14.

Some embodiments may be configured such that the slide bolt 14 may be coupled to a first surface (e.g., the exterior surface) of the animal enclosure gate 10, while the pendant 20 may be slidably coupled to a second surface (e.g., a non-exterior surface) of the animal enclosure gate 10. In some examples, the slide bolt 14 may slide in a direction that is substantially parallel (e.g., horizontal) to the floor or ceiling of the animal enclosure.

In some embodiments, the slide bolt 14 includes a slide bolt handle 26. The slide bolt handle 26 may be adapted to allow a human operator to slide the slide bolt 14 while inside the animal enclosure 12 and/or while outside the animal enclosure 12. This allows a human operator to move the slide bolt 14 if enclosed within the animal enclosure 12, while also providing a mechanism for easily sliding the slide bolt 14 when the human operator is operating the latching device 100 standing outside the animal enclosure 12.

Some embodiments further include a slide bolt notch 28 on the slide bolt 14. The slide bolt notch 28 may receive and/or engage the pendant 20 during operation of the latching device 100. In this manner, the pendant 20 may restrict sliding of the slide bolt 14 when the pendant 20 is received and/or engaged in the slide bolt notch 28. The slide bolt notch 28 may be a notch, a cut-out, a slot, a void and/or the like, and may be of any shape effective to receive and/or engage the pendant 20.

The retainer 16 may guide the slide bolt 14 as the slide bolt 14 slides relative to the animal enclosure gate 10. The retainer 16 may be coupled to the animal enclosure gate 10 via retainer fastener(s) through one or more retainer hole 30. Retainer fasteners may include bolts, screws, nails and other similar fasteners. In some examples, retainer 16 may include one or more retainer lock hole 32. Such retainer lock hole 32 may receive a lock (e.g., a padlock, a combination lock). In some examples, the retainer 16 may be angled, bent and/or constructed such that the retainer includes a flange 34 in which the retainer lock hole 32 may be located. For example, such flange 34 may be angled approximately 90 degrees.

The catch 18 may be coupled to the animal enclosure 12 via catch fastener(s) through one or more catch hole 36. Catch fasteners may include bolts, screws, nails and other similar fasteners. The catch may include a catch slot 38 adapted to receive the slide bolt 14. The catch slot 38 may be aligned with the slide bolt 14 such that the catch slot 38 may receive the slide bolt 14. FIG. 2 depicts an example of the catch slot 38 receiving the slide bolt 14. FIG. 3 depicts an example of the slide bolt 14 not within the catch slot 38. The catch slot 38 may be of any shape that allows the slide bolt 14 to be received within it.

The pendant 20 may be slidably coupled to the animal enclosure gate 10. In some examples, the pendant 20 may engage the slide bolt 14 such that the slide bolt 14 is substantially restricted from sliding. The pendant 20 may be coupled to the animal enclosure gate 10 at a location higher (from the animal enclosure floor) on the animal enclosure gate 10 than the slide bolt 14 is coupled to the animal enclosure gate 10. In some embodiments, the pendant 20 may be coupled to the animal enclosure gate 10 at a location lower (from the animal enclosure ceiling) on the animal enclosure gate 10 than the slide bolt 14 is coupled to the animal enclosure gate 10.

In some examples, the pendant 20 may include one or more pendant hole 40 into which a pendant fastener 42 may fit. The pendant hole 40 may be of any shape that allows the pendant fastener 42 to move within it relative to the pendant hole 40. The pendant fastener 42 may include bolts, screws, nails and other similar fasteners, and may be coupled to the animal enclosure gate 10 at a fixed location. During operation of the pendant 20, the pendant hole 40 may move relative to the pendant fastener 42. In this manner, the pendant 20 may move from a first position to a second position. FIGS. 2 and 3 depict examples of a first position of the pendant 20 and a second position of the pendant 20, respectively. In some examples, the pendant 20 may slide in a direction that is substantially parallel to the wall(s) (e.g., vertical) of the animal enclosure. In some examples, the pendant 20 may slide in a direction that is substantially perpendicular to the wall(s) (e.g., vertical) of the animal enclosure. In some examples, the animal enclosure gate 10 may include the one or more pendant hole 40 and the pendant fastener 42 may be coupled to the pendant 20.

In some examples, the pendant 20 may be slidably coupled to the animal enclosure gate 10 via one or more pendant fastener 42 that may include a bushing 50. The bushing 50 may be received within the pendant hole 40. The bushing 50 may help ensure that the pendant 20 easily drops into place via gravity or some other force. The pendant fastener 42 may "bottom out" on the bushing 50, thus permitting the pendant 20 to slide up and down freely. Example bushings 50 may be comprised of stainless steel, brass, copper, aluminum, plastic and/or other similar materials.

In some embodiments, the pendant 20 includes one or more pendant handle 44. The pendant handle 44 may be adapted to allow a human operator to operate the pendant 20 while inside the animal enclosure 12 and/or while outside the animal enclosure 12. This allows a human operator to move the pendant 20 if enclosed within the animal enclosure 12, while also providing a mechanism for easily sliding the pendant 20 when the human operator is operating the latching device 100 standing outside the animal enclosure 12. In some examples, a pendant handle 44 may be angled approximately 90 degrees. In some examples, a pendant handle 44 may not be angled.

Some embodiments further include a pendant notch 46 on the pendant 20. The pendant notch 46 may receive and/or engage the slide bolt 14 during operation of the latching device 100. In this manner, the pendant 20 may restrict sliding of the slide bolt 14 when the pendant 20 is received and/or engaged in the slide bolt notch 28. FIG. 2 depicts an example in which the pendant notch 46 and the slide bolt notch 28 are engaged. The pendant notch 46 may be a notch, a cut-out, a slot, a void and/or the like, and may be of any shape effective to receive and/or engage the slide bolt 14.

In some examples, pendant 20 may include one or more pendant lock hole 48. In some examples, the pendant lock hole 48 may be located in a pendant handle 44. The pendant lock hole 48 may receive a lock (e.g., a padlock, a combination lock). In some examples, the pendant lock hole 48 and retainer lock hole 32 may align such that a lock may be inserted into both the pendant lock hole 48 and retainer lock hole 32, thus restricting the pendant 20 from moving. In this manner, when the pendant 20 and slide bolt 14 are engaged, the lock may restrict the pendant 20 from moving, and, in turn, may restrict the slide bolt 14 from sliding.

Figure 5:
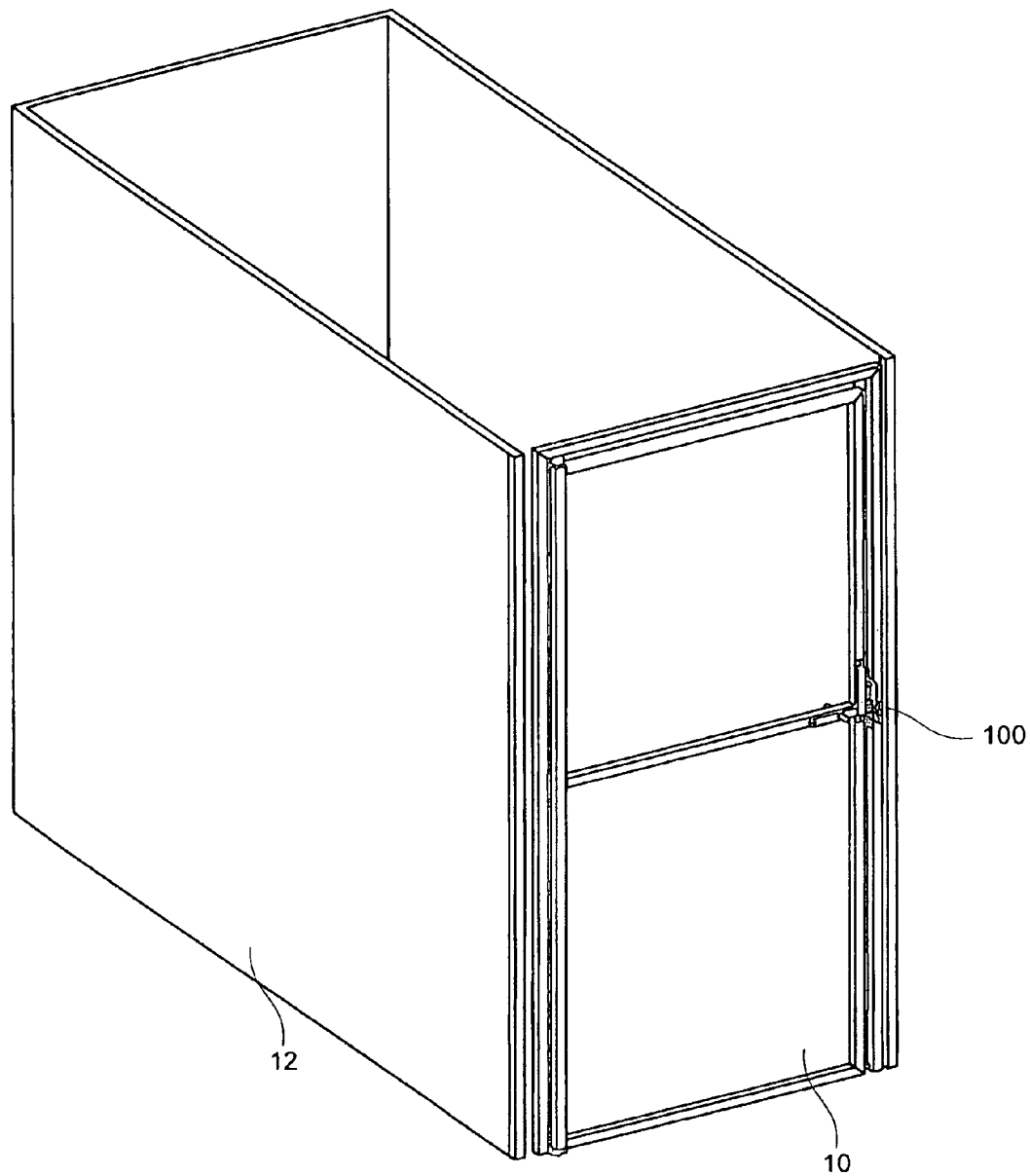
FIG. 5 is a diagram depicting an example embodiment in operation on an example animal enclosure.

As depicted in FIG. 5, an animal enclosure latching device 100 for latching an animal enclosure gate 10 to an animal enclosure 12 is provided. FIG. 5 depicts an embodiment in which the animal enclosure latching device 100 latches the animal enclosure gate 10 to the animal enclosure 12 near the right side of the animal enclosure gate 10. However, it is within the scope of this disclosure that animal enclosure latching device 100 may be located at any point on the animal enclosure gate 10 and animal enclosure 12. For example, the animal enclosure latching device 100 may be located near the left side of the animal enclosure gate 10, or near the animal enclosure 12 floor or ceiling (if any). In some examples, there may be more than one animal enclosure latching device 100 for latching the animal enclosure gate 10 to the animal enclosure 12.

Following from the above description and invention summaries, it should be apparent to those of ordinary skill in the art that, while the methods and apparatuses herein described constitute exemplary embodiments of the present invention, it is to be understood that the inventions contained herein are not limited to the above precise embodiment and that changes may be made without departing from the scope of the invention. Likewise, it is to be understood that it is not necessary to meet any or all of the identified advantages or objects of the invention disclosed herein in order to fall within the scope of the invention, since inherent and/or unforeseen advantages of the present invention may exist even though they may not have been explicitly discussed herein.

What is claimed is:

1. An animal enclosure latching device for latching an animal enclosure gate to an animal enclosure, comprising:
    a slide bolt slidably coupled to the animal enclosure gate, the slide bolt adapted to slide in at least one of a first and second direction relative to the animal enclosure gate;
    a retainer coupled to the animal enclosure gate, the retainer adapted to guide the slide bolt as the slide bolt slides;
    a catch coupled to the animal enclosure, the catch adapted to receive the slide bolt; and
    a pendant slidably coupled to the animal enclosure gate in at least one of a third and fourth direction, the pendant adapted to engage the slide bolt,
    wherein the first and second directions are substantially perpendicular to the third and fourth directions.

2. The animal enclosure latching device of claim 1, wherein the pendant engages the slide bolt such that the slide bolt is restricted from sliding relative to the animal enclosure gate.

3. The animal enclosure latching device of claim 1, wherein the slide bolt is slidably coupled to a first surface of the animal enclosure gate; and wherein the pendant is slidably coupled to a second surface of the animal enclosure gate.

4. The animal enclosure latching device of claim 1, wherein the slide bolt is slidably coupled to an exterior surface of the animal enclosure gate.

5. The animal enclosure latching device of claim 1, wherein the slide bolt is slidably coupled to the animal enclosure gate by at least one slide bolt fastener.

6. The animal enclosure latching device of claim 1, wherein the first and second directions are substantially parallel to a floor of the animal enclosure.

7. The animal enclosure latching device of claim 1, wherein the pendant is slidably coupled to a non-exterior surface of the animal enclosure gate.

8. The animal enclosure latching device of claim 1, wherein the pendant is slidably coupled to the animal enclosure gate by at least two pendant fasteners.

9. The animal enclosure latching device of claim 1, wherein the third and fourth directions are substantially perpendicular to a floor of the animal enclosure.

10. The animal enclosure latching device of claim 1,
wherein the pendant includes a pendant lock hole therethrough;
wherein the retainer includes a retainer lock hole therethrough;
wherein a lock may be inserted into the pendant lock hole and the retainer lock hole to restrict movement of the pendant.

11. The animal enclosure latching device of claim 1,
wherein the slide bolt includes a slide bolt notch; and
wherein the pendant engages the slide bolt at the slide bolt notch.

12. The animal enclosure latching device of claim 1,
wherein the pendant includes a pendant notch; and
wherein the pendant engages the slide bolt at the pendant notch.

13. The animal enclosure latching device of claim 1,
wherein the slide bolt includes a slide bolt notch;
wherein the pendant includes a pendant notch; and
wherein the pendant notch engages the slide bolt notch.

14. The animal enclosure latching device of claim 1, wherein the slide bolt includes a slide bolt handle adapted to allow a human operator to slide the slide bolt while inside the animal enclosure and/or while outside the animal enclosure.

15. The animal enclosure latching device of claim 1, wherein the pendant includes a pendant handle adapted to allow a human operator to slide the pendant while inside the animal enclosure and/or while outside the animal enclosure.

16. An animal enclosure latching system, comprising:
an animal enclosure gate pivotally coupled to an animal enclosure; and
an animal enclosure latch device adapted to at least temporarily latch the animal enclosure gate to the animal enclosure, the animal enclosure latch device comprising:
a slide bolt slidably coupled to the animal enclosure gate;
a retainer coupled in a first and second direction to the animal enclosure gate, the retainer adapted to guide the slide bolt as the slide bolt slides relative to the animal enclosure gate;
a slotted catch coupled to the animal enclosure, the slotted catch adapted to receive the slide bolt;
a pendant slidably coupled in a third and fourth direction to the animal enclosure gate, the pendant adapted to engage the slide bolt; wherein the pendant is slidably coupled to the animal enclosure gate via one or more bushings,
wherein the first and second directions are substantially perpendicular to the third and fourth directions.

17. The animal enclosure latching system of claim 16, wherein at least one of the one or more bushings is comprised of at least one of stainless steel, brass, copper, aluminum and plastic.

18. The animal enclosure latching system of claim 16, wherein the pendant is coupled to the animal enclosure gate higher than the slide bolt is coupled to the animal enclosure gate.

19. An animal enclosure latch for latching an animal enclosure gate to an animal enclosure, comprising:
a slide bolt slidably coupled to the animal enclosure gate, the slide bolt having a slide bolt notch;
a retainer coupled in a first and second direction to the animal enclosure gate, the retainer having a retainer lock slot therethrough, the retainer adapted to guide the slide bolt as the slide bolt slides relative to the animal enclosure gate;
a slotted catch coupled to the animal enclosure, the slotted catch adapted to receive the slide bolt; and
a pendant slidably coupled in a third and fourth direction to the animal enclosure gate, the pendant having a pendant notch and a pendant lock slot, the pendant adapted to engage the slide bolt notch via the pendant notch,
wherein the first and second directions are substantially perpendicular to the third and fourth directions.

20. The animal enclosure latch of claim 19, wherein a lock may be inserted into a pendant lock hole and a retainer lock hole to restrict movement of at least one of the slide bolt and the pendant when the slide bolt is received by the slotted catch.

\* \* \* \* \*